3,792,047
N-(7,2' - THIENYLACETAMIDOCEPH - 3-EM-3-YLMETHYL)-3" OR 4"-N-HYDROXYLOWER-ALKYLCARBAMOYL-PYRIDINIUM - 4-CARBOXYLATES
Vincent Arkley, Colombo, Ceylon, and Stephen Eardley, Southport, and Alan Gibson Long, Greenford, England, assignors to Glaxo Laboratories Limited, Greenford, England
No Drawing. Continuation-in-part of application Ser. No. 329,212, Dec. 9, 1963. This application Dec. 7, 1971, Ser. No. 205,743
Int. Cl. C07d 99/24
U.S. Cl. 260—243 C  3 Claims

ABSTRACT OF THE DISCLOSURE

Compounds of the formula

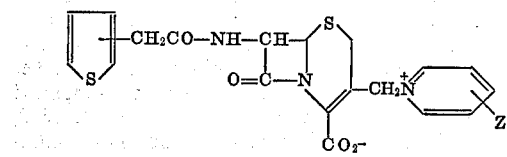

in which Z is N-(hydroxylower alkyl)-carbamoyl. Of particular importance are N-(7-2'-thienylacetamidoceph-3-em-3-ylmethyl)-3"-N-hydroxymethylcarbamoyl - pyridinium-4-carboxylate and N-(7 - 2' - thienylacetamidoceph-3-em-3-ylmethyl)-4"-N-hydroxymethyl carbamoyl-pyridinium-4-carboxylate which are especially suited as long-acting antibiotics giving unusually prolonged serum levels following injection.

---

This application is a continuation-in-part of copending application Ser. No. 329,212, filed Dec. 9, 1963.

This invention is concerned with improvements in or relating to novel derivatives of 7-aminocephalosporanic acid (7–ACA), i.e. the compound whose structure is normally interpreted as:

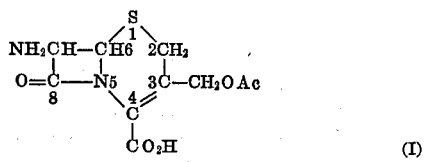

We have found that certain derivatives of 7–ACA have good antibiotic spectrum both against gram positive and gram negative organisms as evidenced for example by animal tests, as well as possessing generally good resistance to attack by pencillinase-producing staphylococci. The compounds have good stability in vivo and moreover give sustained serum levels following intramuscular injection.

The present invention, therefore, provides as new compounds, compounds of the general formula:

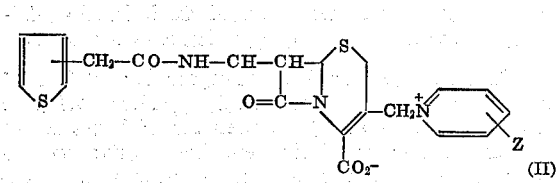

in which Z is N-(hydroxyloweralkyl)-carbamoyl.

The term "lower alkyl" as used herein indicates groups containing 1–6 carbon atoms, preferably 1 or 2 carbon atoms.

The compounds according to the invention may be prepared by reacting a compound of the general formula

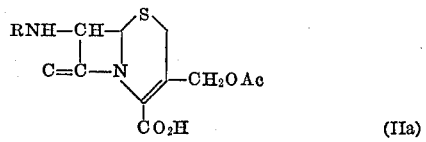

or a water soluble salt thereof, where R is hydrogen or a thienylacetyl group, with a nucleophile of the formula

in a strongly polar medium, the resulting compound where R is hydrogen being thioacetylated.

The preferred process according to the invention comprises reacting a compound of the formula

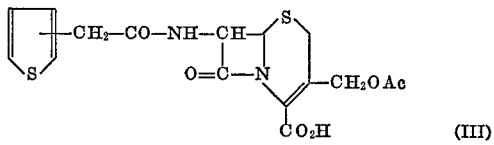

or a water soluble salt thereof, with a nucleophile of Formula IV given above, in a strongly polar medium. Where salts of compounds of Formula III are employed suitable salts are for example sodium, potassium or ammonium salts. Water is the most generally suitable medium but in those cases in which the nucleophile is not very soluble in water, a water miscible organic solvent such as N,N-dimethylformamide or acetone may be added although this may tend to lower the yield.

The temperature of reaction is conveniently at least 15° C., but in general less than 70° C.

The time for which the reaction should be allowed to proceed depends on the temperature used but can be determined by preliminary trial.

The reactants are advantageously employed in a ratio of about 1 molar equivalent of Compound III to 1–10 molar equivalents of nucleophile. The pH of the solution is advantageously maintained within the limits 5 to 8, preferably 6 to 7. If necessary, the pH of the solution should be adjusted to the desired value by the addition of a buffering agent such as ammonium acetate or when employing an alkali metal salt of the compound of general Formula III by the addition of, for example, acetic acid.

The reaction product may be separated from the reaction mixture which may contain, for example, unchanged compound of Formula III and other substances, by conventional processes including crystallization, electrophoresis, paper chromatography or by treatment with an ion-exchange resin.

A convenient procedure is to react an excess of the compound of Formula IV with the compound of Formula III in water until an optimum yield of the desired Compound II is obtained. Excess Compound IV and some of the reacted Compound III are then extracted with an organic solvent, e.g. methylene chloride, and the residual solution percolated through an anion-exchange resin, e.g., in an acetate form to remove any free carboxylic compounds and the rest of the unreacted Compound III. The residual solution is then concentrated, e.g. in a rotary evaporator and freeze-dried. The residue may then be crystallized from a suitable solvent, e.g. methanol or purified by precipitation, for instance, from a methanolic solution by the addition of acetone.

The compounds of Formula III given above may be prepared by reacting 7–ACA with a thienylacetylating agent. Convenient thienylacetylating agents are in general those of the type suitable for thienylacetylating aminoamides for example peptides, and include particularly thienylacetyl halides, especially the chloride or bromide, and mixed anhydrides derived for example from thienylacetic acid and an alkyl haloformate. The acylation is conveniently carried out in an aqueous medium, for example an aqueous water-miscible ketone such as acetone, or aqueous tetrahydrofuran, preferably also in the presence of an acid binding agent for example sodium bicarbonate. The pH is preferably maintained at from 5 to 7 during the reaction, which may be carried out at temperature of from 0 to 25° C. The acylation may also be carried out in an organic solvent medium, e.g. ethyl acetate, for example by simple refluxing.

As will be seen, the compounds according to the invention can be made by first reacting 7–ACA with the chosen nucleophile of Formula IV to form a compound having the formula

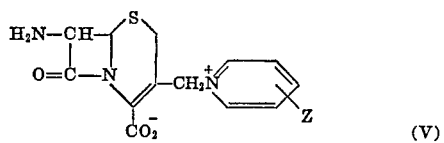

(V)

followed by acylation of the resulting compound with a thienylacetylating agent. These reactions can be carried out generally under the conditions described above for the nucleophilic and acylation reactions when carried out in the preferred sequence.

Alternatively the compounds of Formula V can be prepared from a compound of the formula

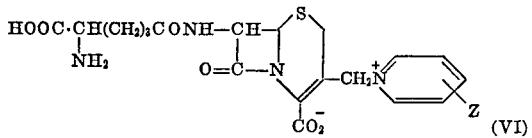

(VI)

by methods known for the conversion of cephalosporin C to 7–ACA. The compound of Formula VI can be prepared from cephalosporin C by reaction with nucleophilic compounds of Formula IV by methods analogous to those described above for reaction of compounds of Formula III with compounds of Formula IV.

The specific compounds disclosed herein are named with reference to the substance cepham (see J.A.C.S. 1962, 84, 3400).

Two compounds according to the invention of particular importance are N-(7-2'-thienylacetamidoceph-3-em-3-ylmethyl)-3''-N-hydroxymethylcarbamoyl - pyridinium-4-carboxylate and N-(7-2'-thienylacetamidoceph-3-em-3-ylmethyl)-4''-N - hydroxymethcarbamoyl - pyridinium-4-carboxylate. These compounds have a broad spectrum of activity against a wide variety of gram-positive and gram-negative organisms including penicillin-resistant strains of S. aureus. The compounds further possess a low order of systemic toxicity.

The compounds of the invention are particularly suited for use as long-acting antibiotics giving particularly prolonged serum levels following for example intramuscular injection. The compounds are thus useful for the formulation of depot preparations.

The compounds according to the invention may be formulated for administration in any convenient way by analogy with other long-acting antibiotic substances and the invention thus includes within its scope a pharmaceutical composition comprising a compound of general Formula II adapted for use in human or veterinary medicine. Such compositions may be presented for use in appropriate manner with the aid of any necessary pharmaceutical carriers or excipients, e.g. dispersing or suspending agents or oily bases.

The compounds may thus be made up into injectable preparations in suspension in suitable media, e.g. sterile, pyrogen-free water or as dry preparations suitable for the extempore preparation of injectable preparations.

For veterinary medicine the compounds may be formulated in a manner conventional in veterinary medicine for example for injection as veterinary cerates.

In general the dosages employed in human medicine on adults will range from 200 mg. per dose upwards, the maximum simply being governed essentially by conventional medical considerations and being of the order of 2.0 grams. Administration may take place at the discretion of the physician for example daily.

The compounds according to the invention may be administered in combination with other antibacterial antibiotics for example the penicillins such as penicillin G and/or the tetracyclines, or in combination with other more soluble cephalosporin antibiotics, e.g. the compound of Example 1(b) of our application Ser. No. 329,212, filed Dec. 9, 1963, of which this application is a continuation-in-part.

In order that the invention may be well understood the following examples are given by way of illustration only. Ultra-violet absorption pertains to solutions in water or aqueous phosphate buffer at pH 6.0. Melting points were measured with the compounds in capillary tubes.

EXAMPLE 1

(a) 7-2'-thienylacetamidocephalosporanic acid 7-aminocephalosporanic acid (5.00 g.) which passed through a 100-mesh sieve was suspended in boiling ethyl acetate (200 ml.), and 2-thienylacetyl chloride (Cagniant, Bull. Soc. Chim. France, 1949, 847) (4.42 g., 1.5 equiv.) was added in ethyl acetate (20 ml.). The mixture was boiled under reflux for 40 min., cooled, and filtered. Aniline (5.03 ml.) was added, and after 1 hr. the mixture was extracted with 3%-sodium hydrogen carbonate solution (1× 150 ml., 2× 100 ml., 1× 50 ml.) and the alkaline extracts washed with ethyl acetate (3 × 100 ml.). The aqueous solution was acidified to pH 1.2, and extracted with ethyl acetate (2× 150 ml.). The ethyl acetate extract was washed with water (4× 40 ml.), dried (MgSO$_4$), and concentrated in vacuo to low volume. The crude 7-2'-thienylacetamidocephalosporanic acid (2.5 g.) which separated was collected by filtration. Evaporation of the filtrate gave a further 2.68 g. (71%) of the product, which was purified by crystallization from ethyl acetate, then aqueous acetone, M.P. 156–157° (decomp.); λ max. 237 mμ (ε 14,400), 261 mμ (ε 8,900); [α]$_D$ +84° (c., 0.5, dioxan); the sodium salt, M.P. 204–205° (decomp.), [α]$_D$ +135° (c., 1.0, H$_2$O), was prepared by treating the acid in ethyl acetate solution with 10%-sodium ethylhexanoate in n-butanol. (Found: C, 46.2; H, 3.6; N, 6.3; S, 15.2. C$_{16}$H$_{15}$N$_2$NaO$_6$S requires C, 45.9; H, 3.6; N, 6.7; S, 15.3%.)

(b) N-(7-2'-thienylacetamidoceph-3-em-3-ylmethyl)-3''-N-hydroxymethylcarbamoyl-pyridinium-4-carboxylate 7-(thienyl-2'-acetamido) cephalosporanic acid (5.0 g.) and 3-(N-hydroxymethylcarbamoyl) pyridine (5.7 g., 3 equiv.) in water (45 ml.) were left for 16 hours at 46° under an atmosphere of nitrogen. The solution was extracted with methylene dichloride, the aqueous phase concentrated in a rotary evaporated at <40°, and the concentrate was perculated through a column of Dowex-1 in the acetate cycle. Eluates that contained the desired derivative as judged polarimetrically were combined and freeze-dried. The freeze-dried solid was slurried with methanol to leach out N-hydroxymethylnicotinamide. The dried betaine (1.33 g., 22%) had the following properties:

λ max. 235 nm. ($E_{1\,cm.}^{1\%}$ 351 and 261 nm. ($E_{1\,cm.}^{1\%}$ 276)

$[\alpha]_D^{20°}+27°$ (c. 1.0% water). (Found: C, 48.3; H, 4.5; N, 10.4; S, 12.1. $C_{21}H_{20}N_4O_6S_2 2H_2O$ requires C, 48.1; H, 4.6; N, 10.7; S, 12.2%.)

EXAMPLE 2

N-(7-2'-thienylacetamidoceph-3-em-3-ylmethyl)-4''-N-hydroxymethylcarbamoyl-pyridinium-4-carboxylate 7-(thienyl-2'-acetamido) cephalosporanic acid (5.0 g.) and 4-(N-hydroxymethylcarbamoyl) pyridine (3.9 g., 2 equiv.) in water (45 ml.) were treated in the manner described in Example 1(b), yielding the corresponding bataine (0.955 g., 17%)

λ max. 230 nm. ($E_{1\,cm.}^{1\%}$ 342) and 260 to 261 nm. ($E_{1\,cm.}^{1\%}$ 284)

$[\alpha]_D^{20°}+16°$ (c. 1.0% in N,N-dimethylformamide: water=1:4). (Found: C, 47.55; H, 4.35; N, 10.6; S, 11.6. $C_{21}H_{20}N_4O_6S_2 \cdot 2\frac{1}{2}H_2O$ requires C, 47.3; H, 4.7; N, 10.5; S, 12.0%.)

The biological properties of the compounds prepared in the examples are shown in Table I. The *Staph. aureus* Strains A and C were penicillin resistant while the Strain B was penicillin sensitive.

TABLE I

| Example number | Tube dilation assay (γ/ml.) | | | | | | Mouse protection ($ED_{50}$/mg./kg./dose) subcutaneous administration | |
|---|---|---|---|---|---|---|---|---|
| | Gram positive | | | Gram negative | | | | |
| | *Staph. aureus* Strain A | *Staph. aureus* Strain B | *Staph. aureus* Strain C | *E. coli* | *S. typhimurium* | *Pr. mirabilis* | *S. aureus* Strain B | *E. coli* |
| 1(b) | 0.04 | 0.3 | 1 | <4 | 8 | 8 | <1.5 | 25 |
| 2 | 0.16 | 0.08 | <0.5 | <4 | <4 | 8 | <1.5 | 15 |

We claim:
1. A compound of the formula

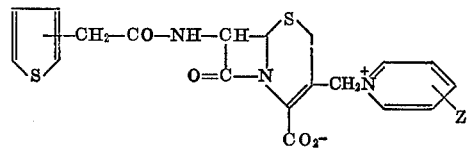

in which Z is N-(hydroxyloweralkyl-carbamoyl.
2. N-(7-2'-thienylacetamidoceph-3-em-3-ylmethyl) - 3''-N-hydroxymethylcarbamoyl-pyridinium-4-carboxylate.
3. N-(7-2'-thienylacetamidoceph-3-em-3-ylmethyl - 4''-N-hydroxymethylcarbamoyl-pyridinium-4-carboxylate.

References Cited
UNITED STATES PATENTS
3,422,099  1/1969  Crast _____ 260—243 C
3,632,810  1/1972  Bickel et al. _____ 260—243 C NICHOLAS S. RIZZO, Primary Examiner U.S. Cl. X.R.
424—246